United States Patent
Mikalsen

(10) Patent No.: US 11,954,695 B2
(45) Date of Patent: Apr. 9, 2024

(54) FARMED FISH TRACKING AND VERIFICATION SYSTEM

(71) Applicant: Venturos Inc., Minnetonka, MN (US)

(72) Inventor: Terje Ernst Mikalsen, Eden Prairie, MN (US)

(73) Assignee: Venturos Inc., Minnetonka, MN (US)

( * ) Notice: Subject to any disclaimer, the term of this patent is extended or adjusted under 35 U.S.C. 154(b) by 0 days.

(21) Appl. No.: 17/719,145

(22) Filed: Apr. 12, 2022

(65) Prior Publication Data

US 2022/0237630 A1 Jul. 28, 2022

Related U.S. Application Data

(63) Continuation of application No. PCT/US2021/041481, filed on Jul. 13, 2021.
(Continued)

(51) Int. Cl.
*G06Q 30/018* (2023.01)

(52) U.S. Cl.
CPC .................. *G06Q 30/0185* (2013.01)

(58) Field of Classification Search
CPC ... G06Q 50/02; G06Q 30/0185; G06Q 30/018
See application file for complete search history.

(56) References Cited

U.S. PATENT DOCUMENTS

2016/0275580 A1 9/2016 Uechi
2017/0103257 A1* 4/2017 Kasin ..................... G06V 40/70
(Continued)

FOREIGN PATENT DOCUMENTS

JP 2002132856 A * 5/2002

OTHER PUBLICATIONS

L. M. Moga, "Cloud computing based solutions for monitoring the supply chain of fish and fishery products," 2017 Eighth International Conference on Intelligent Computing and Information Systems (ICICIS), 2017, pp. 33-38, doi: 10.1109/INTELCIS.2017.8260017 (Year: 2017).*
(Continued)

*Primary Examiner* — Gabrielle A McCormick
*Assistant Examiner* — Maame Ofori-Awuah
(74) *Attorney, Agent, or Firm* — Merchant & Gould P.C.

(57) ABSTRACT

A farmed fish tracking and verification system involves introducing biomarkers into a batch of farmed fish, and storing biomarker information in a database. Other information is also stored in the database, such as production information and funding information. Funding information can include information regarding funders who have contributed funds for the production of the fish. The funding information can also include payment instructions for the funders. Once the fish is processed, and a fish product is delivered to a customer, the fish product can be scanned to detect the biomarker information for approval. The database can then be queried using the biomarker information to track and verify information about the fish. Once the fish product is approved and sold to a customer, a portion of the proceeds can be transferred directly to one or more funders accounts based on the payment instructions. In some embodiments the database stores information relating to the farmed fish in a blockchain, such that the data relating to the farmed fish can also be tracked and verified. Techniques for customized production of fish based on unique needs of an individual or group of people are also disclosed.

20 Claims, 4 Drawing Sheets

Related U.S. Application Data

(60) Provisional application No. 63/050,995, filed on Jul. 13, 2020.

(56) References Cited

U.S. PATENT DOCUMENTS

| | | |
|---|---|---|
| 2017/0278159 A1 | 9/2017 | Chung |
| 2020/0104602 A1 | 4/2020 | Atwater et al. |
| 2020/0184416 A1* | 6/2020 | Javaheri .............. G06K 7/1443 |

OTHER PUBLICATIONS

Yu-Chia Hsu, An-Pin Chen and Chun-Hung Wang, "A RFID-enabled traceability system for the supply chain of live fish," 2008 IEEE International Conference on Automation and Logistics, 2008, pp. 81-86, doi: 10.1109/ICAL.2008.4636124 (Year: 2008).*
Rather, M. A., Sharma, R., Aklakur, M., Ahmad, S., Kumar, N., Khan, M., & Ramya, V. L. (2011). Nanotechnology: a novel tool for aquaculture and fisheries development. A prospective mini-review. Fisheries and Aquaculture Journal, 16(1-5), (Year: 2011).*
PCT International Search Report and Written Opinion for PCT Application No. PCT/US2021/041481 dated Oct. 6, 2021 (15 pages).
Wielogorska et al., Queen's University Belfast, Development of a comprehensive analytical platform for the detection and quantitation of food fraud using a biomarker approach. The oregano adulteration case study; 2018, 27 pages.
Black, Connor; Queen's University Belfast; Innovations in detecting food fraud using mass spectrometic platforms and chemometric modeling; Sep. 2017; 165 pages.

* cited by examiner

FARMED FISH TRACKING AND VERIFICATION SYSTEM

CROSS-REFERENCE TO RELATED APPLICATION(S)

This is a continuation of PCT International Patent Application No. PCT/US2021/041481, filed on Jul. 13, 2021, which claims priority to U.S. Application No. 63/050,995, filed on Jul. 13, 2020, entitled FARMED FISH TRACKING AND VERIFICATION SYSTEM, the disclosures of which are hereby incorporated by reference in their entireties. To the extent appropriate, a claim of priority is made to each of the above-disclosed applications.

BACKGROUND

Fish such as salmon are commonly farmed as a source of food. Land-based farming involves introducing small fish into tanks, and tending them until they have matured. Once they have reached their desired size, they are then processed into fish products and transported to customers.

In recent years, food fraud incidents have occurred that have caused consumers to want to know more about the food products they are purchasing. However, it is difficult for consumers to obtain information that can be trusted about fish products. Similarly, the inability to reliably track and verify fish products also makes it difficult for investors to invest in and support fish farming activities.

SUMMARY

In general terms, this disclosure is directed to a farmed fish tracking and verification system. In some embodiments, and by non-limiting example, biomarkers are introduced into fish and the biomarker information is stored in a database. Other information is also stored in the database, such as production information and funding information. Once the fish is processed, and a fish product is delivered to a customer, the fish product can be scanned to detect the biomarker information. The database can then be queried using the biomarker information to track and verify information about the fish. In some embodiments the database stores information in a blockchain.

One aspect is a farmed fish tracking and verification system for a batch of fish, the system comprising: a database storing a biomarker information, production information, and funding information, the biomarker information identifying a biomarker present in the batch of fish, the production information providing information about the production of the fish, and the funding information providing information regarding one or more sources of funding used to raise the batch of fish; and a server computing device configured to receive requests containing biomarker information, and to provide production information and funding information in response to the requests.

Another aspect is a method of tracking and verifying information associated with a batch of fish, the method comprising: storing biomarker information, production information, and funding information in one or more databases, the biomarker information identifying a biomarker present in the batch of fish, the production information providing information about the production of the fish, and the funding information providing information regarding one or more sources of funding used to raise the batch of fish; receiving a request containing biomarker information; and providing at least one of: production information and funding information associated with the batch of fish in response to the request.

A further aspect is at least one computer-readable storage device storing data instructions that, when executed by at least one processing device of a system, cause the system to: store biomarker information, production information, and funding information in one or more databases, the biomarker information identifying a biomarker present in the batch of fish, the production information providing information about the production of the fish, and the funding information providing information regarding one or more sources of funding used to raise the batch of fish; receive a request containing biomarker information; and provide at least one of: production information and funding information associated with the batch of fish in response to the request.

Another aspect is a fish farming and distribution system comprising the farmed fish tracking and verification system.

A further aspect is a fish farming and distribution system comprising a farmed fish tracking and verification system operable to introduce at least one biomarker into a batch of fish, the farmed fish tracking and verification system including at least one database identifying the biomarker and storing information about the batch of fish. The fish farming and distribution system includes any one or more of the following: a secure distributed blockchain database; a producer or an interface for receiving information from the producer; investors or an interface for receiving information and/or payments from the investors; a batch investment or an interface for receiving information associated with the batch investment; at least one tank for raising the batch of fish; a production system or an interface for receiving information from the production system; a post-production system or an interface for receiving information from the post-production system; a transportation system or an interface for receiving information from the transportation system; a direct to consumer system or an interface for receiving information from the direct to consumer system; a wholesaler or a retailer, or an interface for receiving information or requests from the wholesaler or retailer; a scanning device, or an interface for communication with the scanning device; and a batch payment system, or an interface for receiving information from a financial institution handling the batch payments.

BRIEF DESCRIPTION OF THE DRAWINGS

FIG. 3 is also an example of a farmed fish tracking and verification system.

DETAILED DESCRIPTION

Figure 1:
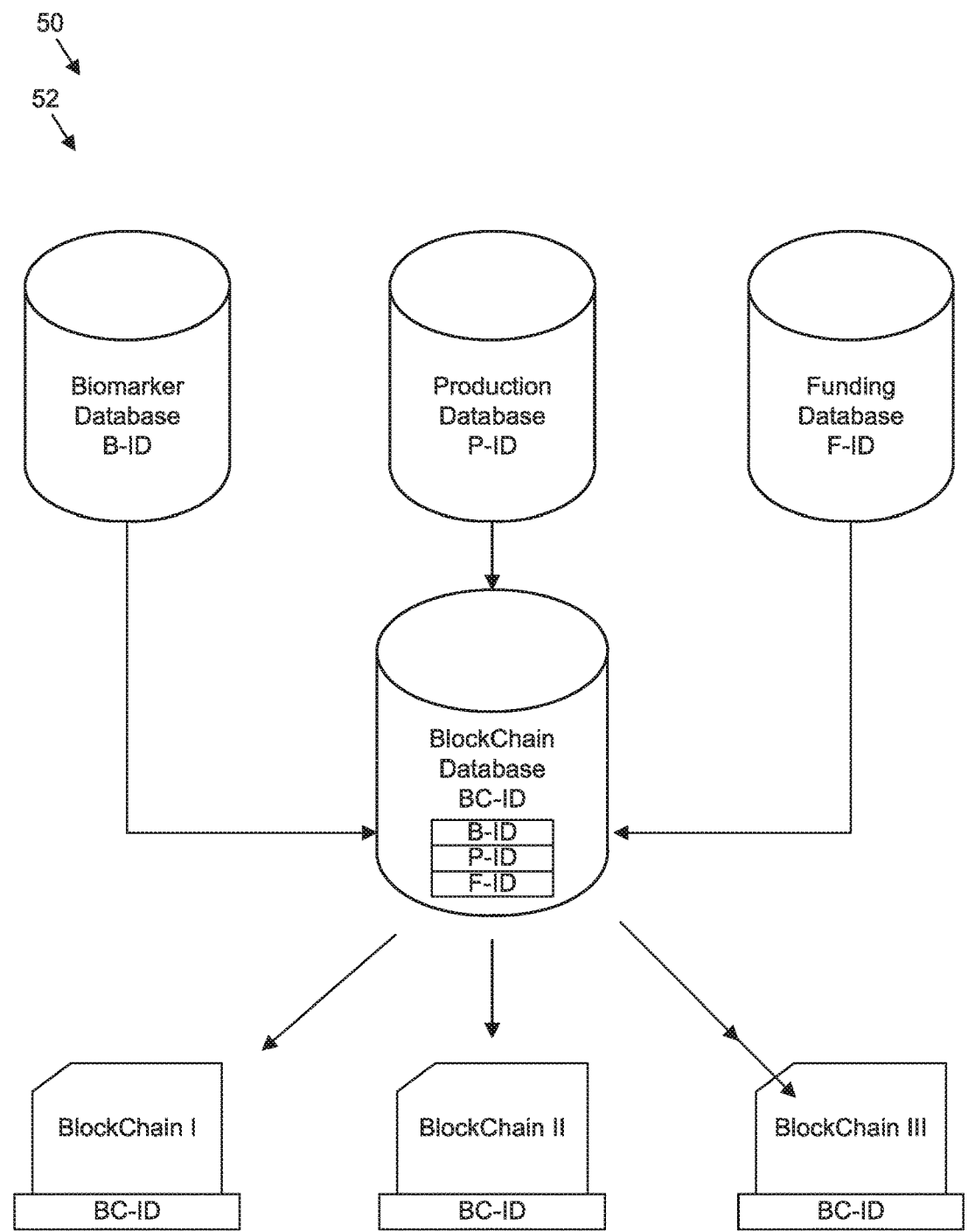
FIG. 1 illustrates an example of the generation of blockchain-stored information.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A farmed fish tracking and verification system is described herein.

One aspect of the present disclosure is a system that allows a fish farm to finance the cost of growing batches of fish in a land-based tank by selling financial instruments (e.g., secured loans, or bonds) to large and small investors, such as utilizing crowd funding.

Some embodiments according to the present disclosure utilize two important technologies, including biomarking and blockchain data storage, that are used to secure correct identification of the fish and correct payment of same by the retailer (or consumer) to interested parties when the product is sold.

Secure identification of the meat is automatically provided by a biomarker system that enables the reading of a unique "fingerprint" in the meat and determine its origin.

Guided by that fingerprint, the buyer can download blockchain-protected information about the meat regarding its origin, safety, etc.

In some embodiments, the blockchain-protected information includes specific payment instructions to secure a predefined amount of money out of the sales proceeds, which will be transferred automatically to the specific "Bond Account" (and to others if needed).

Because of the blockchain data storage, no one can change the instructions, and no one can change the fish content in the package without being discovered, in which case the sale is not going through. Although data in the blockchain data storage itself can be updated or modified, the changes that are made are securely tracked in the blockchain database so that any attempts to tamper or falsify the information can be detected.

There are two situations that might disrupt the Bond:

The fish may die in the tank or it may be stolen. Both risks can be insured against. In another possible embodiment, and as discussed in further detail herein, the funding can be secured across multiple tanks to reduce the risk of loss for one or more tanks.

In at least some embodiments, the fact that no attached outside documentation is needed and no human involvement is required, the process can be inexpensive and highly scalable, and can be utilized as a means for crowd funding of fish farms.

In some embodiments a crowd funding system can be utilized to conduct the financial transactions, including identifying investors and obtaining the payment of the funds, and transferring of those funds to a fish farm account. For example, the crowd funding system (or another system) operates to:

Sell the fish bonds to investors and collect the money on behalf of the fish farm. In some embodiments a minimum investment is required, such as at least $50 US.

Transfer funding to the fish farm.

Once the fish associated with the fish bonds are sold, payments are received into a bond account based on the blockchain-stored instructions.

Bond holders are then repaid from the bond account, also according to the blockchain-stored information. In typical embodiments, the repayment to bond holders is greater than the original amount of the investment, such as based on an interest rate (e.g., 10% of the sale price, which may be the wholesale or the retail price). The interest rate can be predetermined, such as identified at the time that the bond is sold, or can be based on other factors. In some embodiments a fee is also paid to the crowd funding system (e.g., 5%).

In some embodiments, the funds received by the fish farm from the sale of the fish bond is used to cover one or more costs of growing the fish, such as to pay for smolt, feed, renting the tank, other capital expenditures, control and management expenses, a defined profit margin to the producer. In typical embodiments the total expenditures are limited so as to remain below a safety margin of the market price.

As one example: A current market price is approx. 70 NOK/kg for round fish. If a cost to raise the fish is estimated at or below 30 NOK/kg, and the fish bond is sold at 45 NOK/kg, it would mean a 15 NOK prepay on profits.

The payment instruction for repayment of the bonds may also include payment for expected costs, such as prearranged shipping, etc. If all sales and purchase details are stored in the blockchain, most or all manual transaction costs and paperwork can be eliminated.

The biomarking technology marks the packaged fish product in such a way that any changes to the content in the package can be identified and automatically block the sale of and payment for that lot. In this way, the fish product can be prevented from being sold without properly referring to the blockchain and identifying the payment terms contained therein.

Fish Bonds

People are invited to invest into the fish inventory by buying into a fish bond (e.g., series x) as loans which are secured by automatic payments back to a designated bond account. In some embodiments the bond account is managed by a finance system that handles repayment of principal and interest to the investors who purchase the bond accounts.

In some embodiments other payment instructions are handled separately.

There is a risk that the fish may be destroyed by, e.g., malfunction in the tank. One way to reduce the risk is to have multiple tanks in production simultaneously, such that the total average risk is lowered. The risk can then be insured, for example. In another possible embodiment, payments can be secured by depositing cash and offer free shares in the fish farm as a back-up. In some embodiments the fish bond is structured to be a very safe investment with a high return.

In some embodiments, risk is reduced by operating with multiple completely separated tanks. For example, each tank may have a capacity of equal to or less than 150 tons at any given time. This reduces the risk by preventing cross-contamination or the spread of illnesses and the like. If something happens to one of the tanks, the other tanks are separated from it so that they are unaffected.

Although the present disclosure describes one example implementation involving fish farms for raising fish, the same principles and technology can be applied to any marine food product or marine biomass, and even other food products, provided that the food products can be identified by the biomarkers described herein. Examples of other food products include meat (e.g., beef, lamb, poultry, pork, and the like).

Similarly, the present disclosure describes one example implementation involving the use of blockchain technology. The same principles and technology can be implemented with other forms of data storage, data validation, and/or encryption that can be used to secure payment instructions and to associate those payment instructions with the food product.

FIG. 1 illustrates an example blockchain-stored information generator 52 of a farmed fish tracking and verification system 50, that generates blockchain-stored information. In the illustrated example, the generator 52 includes a biomarker database, a production database, a funding database, a blockchain database, and a plurality of blockchains (e.g., blockchain I, II, and III). The generator 52 can also include one or more computing devices, such as the computing device 70 illustrated in FIG. 4.

The biomarker database stores biomarker information. For each batch of fish in a tank, a new unique biomarker is formulated and introduced to the fish, and the identifier for the biomarker (B-ID) is initially stored in the biomarker database. In some embodiments a biomarker (and biomarker identifier) can be reused after a period of time, or after a number of batches, without risk of overlap.

The production database stores information relating to production and post-production. For each batch of fish in a tank, a unique identifier of the batch (P-ID) is generated and initially stored in the production database. In addition, a vast amount of information detailing the production of the fish in the tank can be collected in the production database including, for example, biology in the tank, water conditions/chemistry, fish welfare, status of fish development (e.g., whether and how many fish have reached maturity or are in other states of development), food fed to the fish (brand, type, batch or other ID number, content of the feed), details of the biomarker in the feed, water temperature, weather conditions, or any other measurable, detectable, or recordable data detailing or relating to the production or post-production of the fish. All such information can be securely stored in the blockchain database, as discussed below.

The funding database stores information relating to the source(s) of funding for the fish farm. For each batch of fish in a tank, a unique identifier for the funding of the batch is made. (In some embodiments, multiple funding databases associated with multiple tanks can be assigned to be jointly liable for severe losses in one or more of the multiple tanks.) The funding database can store information about any funders, including people or businesses who have contributed to the development of the fish, such as individual or institutional investors, or any other person or group. In some embodiments the funders are people who have paid money and are owners of the fish, the ownership being defined by a contractual agreement. For example, upon sale and acceptance of the fish product by a retailer customer or end consumer, payment is made back to the funders as defined in the funding database. The payment is typically greater than the original investment, such that the investor is receiving a return on the investment that is a percentage or other amount greater than the original investment. The funding database can identify an individual bank account associated with the batch of fish, or can identify specific bank accounts for specific investors. In some embodiments, the funding database data allows payments to be made directly and automatically from a purchaser's account to the funders without first having to pass through the producer's account or through other managing or overseeing systems or accounts. This ensures to the funders that they will be paid upon acceptance of the fish product by the customer, and prevents other parties from interfering with, or choosing not to fulfill, the payments. Also, in the case that the fish product is damaged, lost, or otherwise not accepted, alternative sources of payment, such as from an insurance company or other backup or emergency source of funds, can be automatically paid directly to the funders, also without first needing to pass through another person or company's account.

Other databases, not shown in FIG. 1, can also be utilized and can store additional information. For example, customer, retail, and wholesale databases can be provided to provide additional information to the blockchain database for storage in the blockchain associated with the batch of fish.

The blockchain database operates as the main database, and collects and stores information from the other databases, including from the biomarker database, the production database, the funding database, and any other databases. The information is shared by the databases to the blockchain database, which connects the information together. For example, the blockchain database generates a unique blockchain identifier (BC-ID), and stores the blockchain identifier together with the biomarker identifier (B-ID), production identifier (P-ID), and funding identifier (F-ID). This information is stored in the blockchains (e.g., blockchains I, II, and III) according to blockchain data storage techniques. The blockchain database can be subsequently queried to access the data stored in the blockchains. For example, when a fish is sold, the biomarker can be used to obtain the biomarker identifier from the biomarker. The biomarker identifier is then used to query the blockchain database and retrieve the production identifier and the funding identifier. In some embodiments the biomarker, production, and funding databases can also be queried to obtain additional information associated with the fish. Any or all of the data contained in the biomarker database, production database, funding database, or other databases can also or alternatively be stored in the blockchain database.

Based on the vast amount of information that can be stored in the blockchain database or other associated databases, it is possible for an interested party to access and analyze the data. For example, a retailer customer or consumer can access the data to learn about the history of a fish product that it has or is about to purchase, such as to verify that the food product is what it is advertised to be including the type of fish, that it was raised in a suitable environment (e.g., free of toxins, clean water, etc.), that it came from a particular location or farm, and the like. Some embodiments involve a research facility that operates to analyze the status or health of the fish or the tanks. The research facility can similarly use Big Data technologies to discover problems at an early stage so that they can be rectified, or for other purposes. In another possible embodiment, a computing device (the server or another computing device, such as including the scanning device) can retrieve production information from the database using the biomarker identifier, and process the production information to analyze one or more chemical or biological constituents of the batch of fish based on one or more of: data documenting food fed to the batch of fish, water content data, data documenting chemicals introduced into the fish tank, or other data. The computing device can then generate a report of the chemical or biological constituents based upon the analysis. In some embodiments the report confirms an absence of the one or more chemical or biological constituents in the production data. For example, if a person has an allergy, the report can confirm the absence of the allergen during the production of the fish farming. As another example, if a person chooses not to eat certain types of food, the report can confirm the absence of such types of food. Similarly, if the constituent is present, then a report can be generated informing that the constituent is or may be present in the fish product.

In some embodiments data stored in the database is usable to optimize future production and to facilitate research. For example, data can be received and collected regarding customers, whether on an individual basis (a specific person) or across a group of customers. Production can be customized for the unique needs of the customers, such as by altering the constituents of the food fed to the fish to be most beneficial for the customers and to avoid constituents that are detrimental to the customers. As several examples, the data relating to the customers can include age, blood type, activity data (such as steps walked per day, and the like, which can be collected by a smart watch or activity tracker, for example), eating habits, and any other information. Then, using this information, data analytics can be performed, such as utilizing machine learning techniques (artificial intelligence), to identify changes that should be made to the production process to improve the benefits of the fish product for the customers. In some embodiments the machine learning techniques are processed on a server computing device.

A customer can interact through a user interface (such as through a smartphone app, computer program, or web-based interface) to tailor define their own food, individually or in cooperation with others. As an example, a group of customers with O+ blood type may benefit from a certain mix of amino acids in the fish product, resulting in a beneficial effect on their own amino acids. A batch of fish could then be produced that has that certain mix of amino acids customized for the particular individual or group of people.

It is also possible for the data to be analyzed using "big data"-type data analytics (such as including machine learning, including artificial intelligence) techniques to learn from the data and improve and adjust production factors in the future. For example, if it is found that a particular component of fish food is detrimental to the fish or the consumer, adjustments can be made to eliminate the component from fish food used in the future, and the system can be used to verify and validate the producer's or retailer's claim that the component has never been fed to the fish, such that the fish are free of that component.

Figure 2:
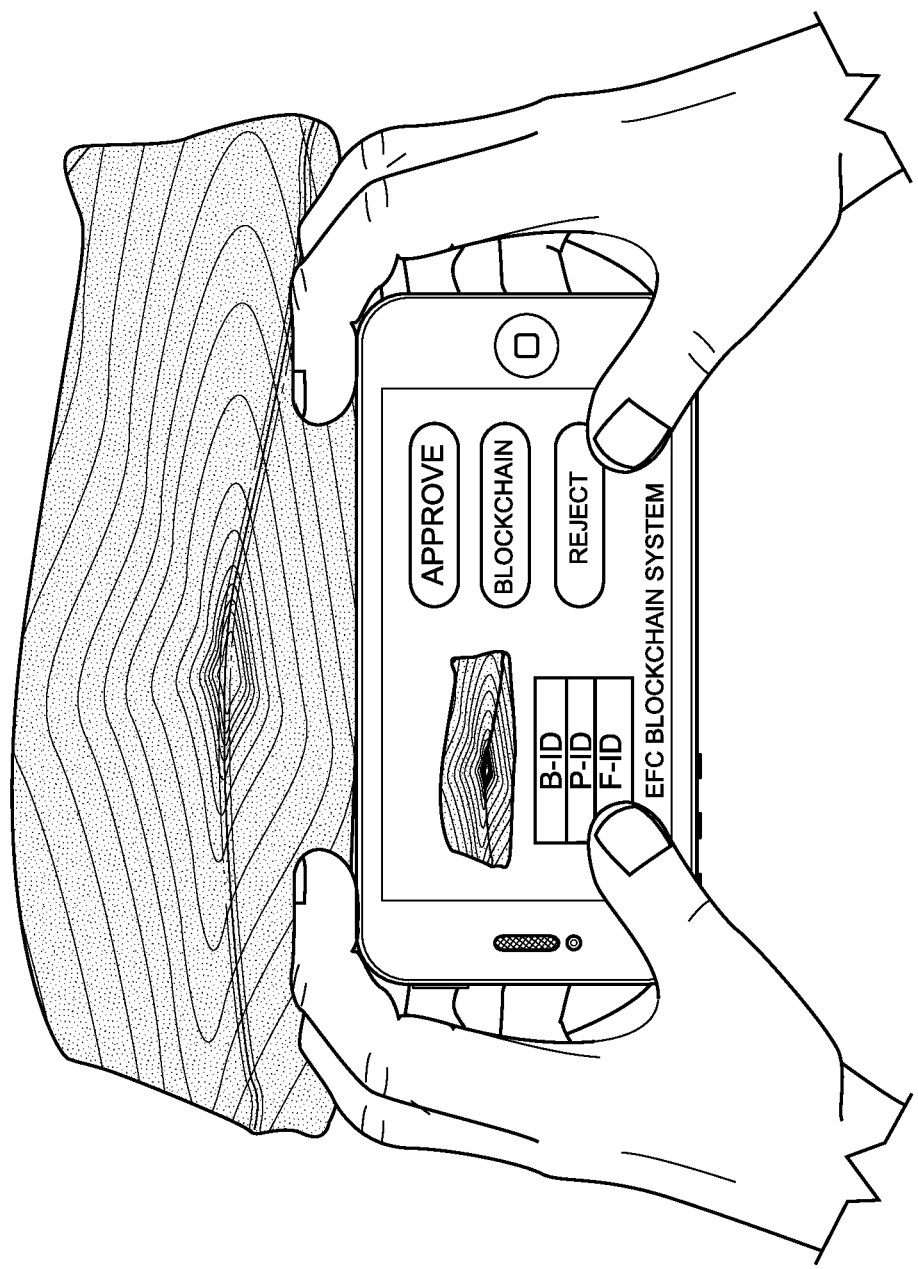
FIG. 2 illustrates an example of a biomarked fish fillet and an example scanning device.

FIG. 2 illustrates a fish fillet containing a biomarker, and a scanning device operating to detect and identify the biomarker.

In some embodiments a unique biomarker is introduced to the fish, such that food products, such as the fish fillet shown in FIG. 2, can be identified as containing the biomarker. In some embodiments the biomarker is selected for a batch of fish, where the biomarker is associated with (and usable to generate with a scanning device) a biomarker identifier. In one example, the biomarker is included in the fish food, which is then fed to the fish and consumed by the fish. The consumption of the biomarker introduces the biomarker into the flesh of the fish, allowing the biomarker to be detected in the fish.

In some embodiments the scanning device includes a computing device and a camera. An example of a scanning device is a smartphone. In some embodiments, the computing device stores in one or more computer-readable storage devices, software instructions that, when executed by the computing device, cause the computing device to perform certain actions. The actions can include one or more of: generating a user interface, operating the camera to capture a picture of the fish (or fish food product, such as the fish fillet), and process the image to generate a biomarker identifier associated with the fish. The application can then send a request to the blockchain database server including the biomarker identifier.

The blockchain database server then verifies the biomarker identifier against the blockchain, and can then send information associated with the fish back to the scanning device application, such as any one or more of the identifiers associated with the biomarker identifier.

The scanner device can be registered in a customer database and verified.

The application can provide the user with information about the fish through the user interface, such as the entire history of the fish, including the production information (e.g., where it was grown, the name and location of the fish farm, or other information such as described herein).

In some embodiments the customer can then choose to verify (accept/approve) or reject the fish based on the information, such as by selecting a verify button or a reject button in the user interface.

After payment is received from the customer for the fish, or after the fish has been verified, the system then transfers funds according to the information in the blockchain associated with that batch of fish. For example, based on agreement and rules set in the system, the funders are repaid when the entire batch (or some subset thereof) is verified and delivered to the customer, or other terms are fulfilled. In some embodiments, the financial transaction is automated by the system.

In some embodiments, a customer develops an inspection process that it utilizes to analyze a shipment of fish product. The inspection process can include scanning one or more, a subset, or all of the fish product using the scanning device, and verifying the data associated with the fish matches the customer's expectations. In one example, a retail customer receiving many fish products in a single shipment, may choose to randomly select a subset of the fish products for validation. In another embodiment, the retail customer can have an automated process (such as a conveyor system and a scanning device that automatically scans all of the fish products). Once the inspection process has been completed, the customer then accepts the shipment, such as by selecting an approve button on the user interface, or by an automated process on a computer sending an acceptance/approval message. The approval by the customer is recorded in the blockchain database. As discussed herein, in some embodiments, upon approval by the customer the funders are automatically paid their respective portions of the proceeds on the sale based on information in the funding database. A wholesale customer can also be involved in some embodiments instead of, or in addition to, the retail customer.

In another embodiment, end consumers can also or alternatively use the scanning device to scan the fish product and confirm that the fish product meets the customer's expectations, such as advertised or marked details regarding the fish product. In some embodiments the end customer's approval can be recorded in the blockchain database, and can be used to trigger payment to the funders. Approval by the end customer can be used in addition to or instead of approval by the retailer or wholesaler to trigger payment to funders or others.

In some embodiments the system stores a special made code to read the information regarding the origin of the product, from the unique biomarker system, and translate this into a payment instruction back to a loan account that has been assigned to each batch. This is all executed as a loop fully secured by the blockchain technology. As a result, it provides a form of a mortgage as a source of funding for the fish farm, without any special documentation or human interaction required, and with a code that cannot be changed from outside.

In other embodiments, example inspection systems can include other scanning devices that operate to detect and identify the biomarker. For example, one example of a scanning device is a mass spectrometer. The mass spectrometer can be used to perform protein mass spectrometry. Mass spectrometry can be used for a several purposes, including but not limited to measuring the mass-to-charge ratio of charged particles (ions), for determining masses of particles, for determining the elemental composition of a sample of molecules, for elucidating the chemical structure of molecules such as peptides. In some embodiments the scanning device identifies the biomarker using peptide mass fingerprinting, which generates a peptide mass fingerprint of a sample of a farmed fish. In one example, the peptide mass fingerprinting determines one or more masses of proteolytic peptides. The one or more masses are then used to conduct a search of the biomarker database to find a match in database of known proteins.

Figure 3:
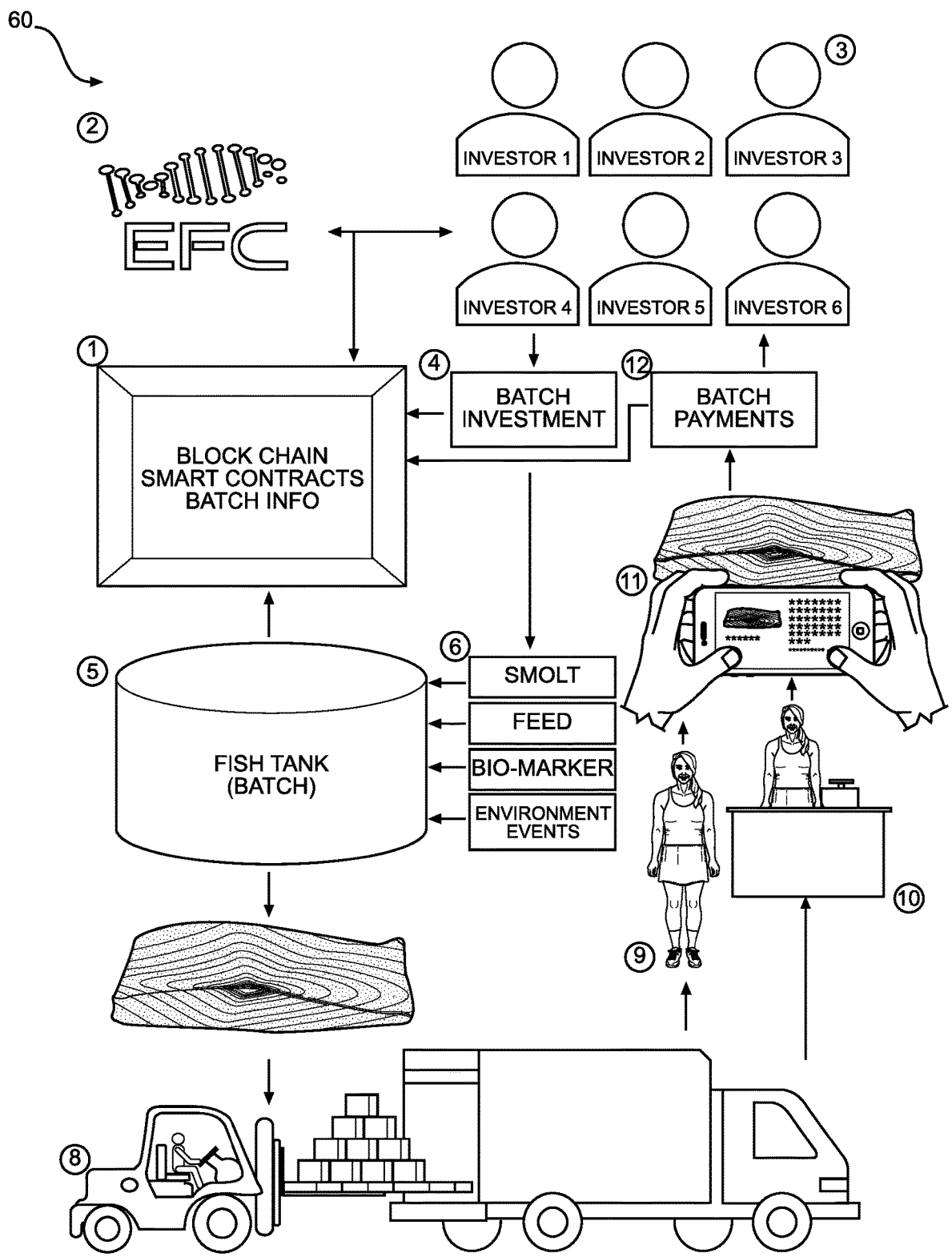
FIG. 3 is a schematic block diagram illustrating an example of a fish farming and distribution system and process.

FIG. 3 is a schematic block diagram illustrating an example of a fish farming and distribution system 60 and process, which in some embodiments includes the example farmed fish tracking and verification system 50, shown in FIG. 1. FIG. 3 is also an example of a farmed fish tracking and verification system. In this example, the system includes a secure distributed blockchain database 1, a producer 2, investors 3, a batch investment 4, a tank 5 for raising fish on a fish farm, production system 6, post-production system 7, transportation 8, direct to consumer 9, wholesaler or retailer 10, scanning device 11 with mobile application, and batch payments 12.

In other possible embodiments, the fish farming and distribution system 60 includes one or more interfaces for communicating with one or more of the following users or systems: a secure distributed blockchain database, a production system, investors, a batch investment system or financial institution, a tank for raising fish on a fish farm, a production system, a post-production system, a transportation system, direct to consumer system, a wholesaler or retailer, a scanning device with mobile application, and a batch payment system or financial institution.

A new blockchain is prepared for a batch at the blockchain database 1. At one or more (or each) of the steps in the process, information is sent to the blockchain database 1 where it is added to the blockchain associated with the batch. In some embodiments the blockchain is a private blockchain with invited users (or their associated computing devices) who have access to read or write information to the blockchain.

A new batch is defined by the producer 2, which identifies a new batch of fish to be raised at the producer's fish farm. The batch can include a certain number of fish, or a certain anticipated weight of the fish, for example. The size of the batch and other information about the fish can be stored in the producer database, such as the type of fish to be raised.

Investments are then obtained from investors 3, who contribute to the batch investment 4. In some embodiments, the investors can review the information about the batch before making the investment.

Once the batch investment has been received, at least a portion of the investment is paid to the producer 2, and fish (or fish eggs) are introduced into the fish tank 5. The fish introduced into the tank can be eggs, alevins, fry, parr, or smolt. In one example, smolt are introduced into the tank. In addition, the fish are fed periodically, and the fish feed includes a biomarker as discussed herein. Maintenance on both the tank and water in the tank can also be performed by the producer 2 as needed. The producer 2 uses the money received from the batch investment to grow the fish in the tank 5.

In some embodiments, after the fish have been grown, post-production 7 occurs, such as processing the fish to generate fish products. The fish products can include fish fillets for example that are removed from the rest of the fish. The fish products contain the biomarker.

The fish products are then delivered through the transportation system 8, where they can be delivered direct to consumer 9, or to a wholesaler or retailer 10. Either of the customers (e.g., consumer 9 or retailer 10) can then use the scanning device 11 to scan the fish product. The scanning device 11 detects the biomarker and gets relevant information about the fish from the blockchain. In some embodiments the transport system 8 (e.g., a transportation company or transporter representative) and customer 9 or 10 sign via the app on the scanning device to confirm that the agreed upon quantity of fish has been delivered, and that the information about the fish obtained from the blockchain database verifies that the appropriate fish was delivered. Payment is then made by the customer and the payment information is stored in the blockchain database.

Batch payments 12 are then made to the investors, such as after the whole batch has been registered as sold, or other terms are fulfilled.

The blockchain database can also be used for a variety of purposes. For example, the producer 2, or post-production system 7, can send information to the blockchain, such as a date the fish was harvested, or the date that the fish was processed to generate the food product. A date can then be generated by which the fish should be sold or delivered to a customer (a sell-by date, or a use-by date, for example). This date can be stored in the blockchain, or computed based on the information in the blockchain. The customer 9 or 10 can then use this information to ensure that the fish product has been delivered in a timely manner after the fish was harvested, to confirm freshness of the product. The dates generated can depend on the type of packaging used (e.g., standard or vacuum sealed), a transportation method used, and whether the fish product is fresh or frozen. All such information can be stored in the blockchain database, if desired.

Figure 4:
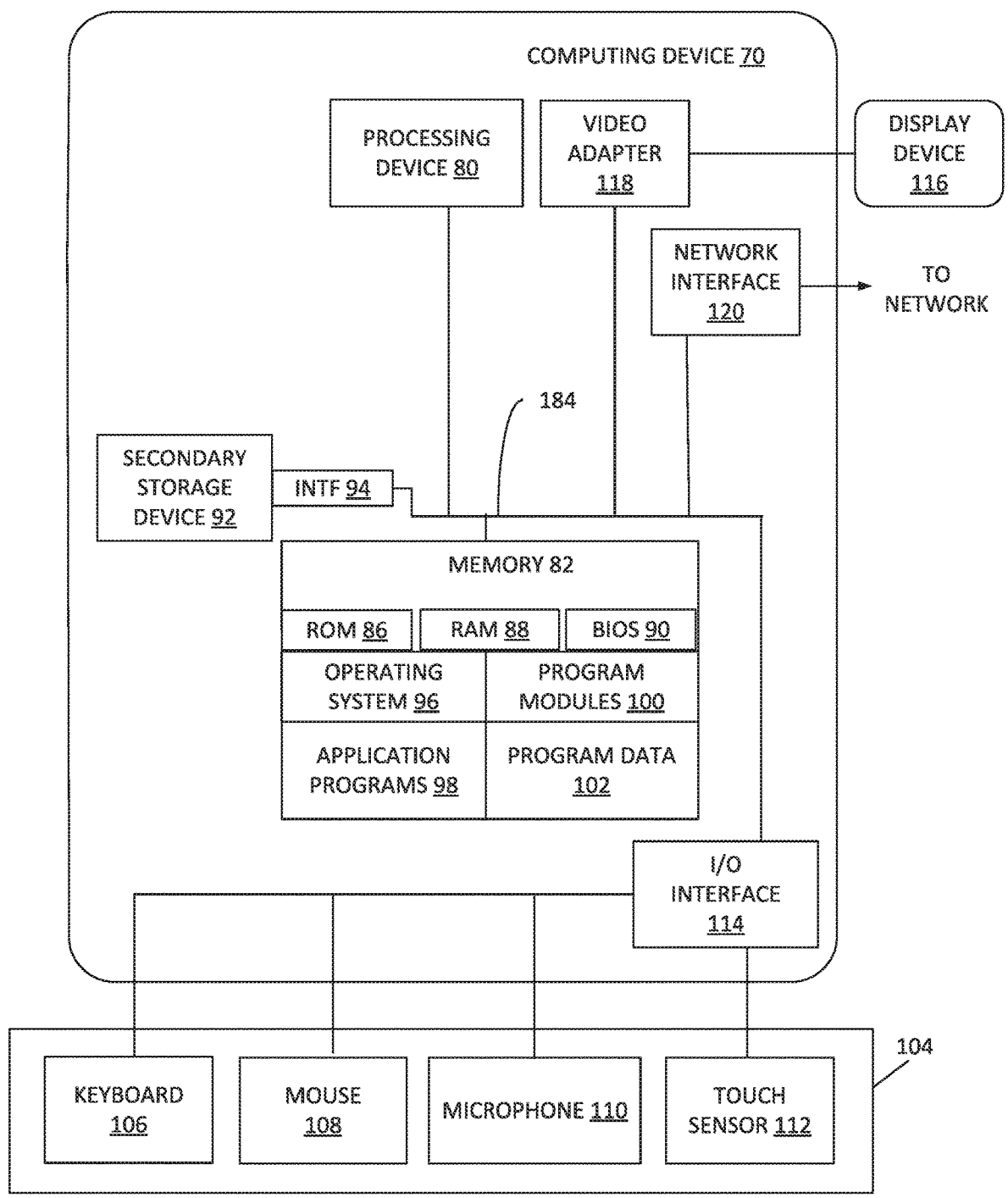
FIG. 4 illustrates an example computing device.

FIG. 4 illustrates an exemplary architecture of a computing device that can be used to implement aspects of the present disclosure, including any of the scanning device, blockchain database server, or any other computing devices of the producer, producer system, investors, financial systems, post-producer, post-producer system, transport, customers, or any third parties, and also including computing devices operating any of the databases described herein. The computing device illustrated in FIG. 4 can be used to execute the operating system, application programs, and software modules described herein. By way of example, the computing device will be described below as the computing device 70. To avoid undue repetition, this description of the computing device will not be separately repeated herein for each of the other computing devices, but such devices can also be configured as illustrated and described with reference to FIG. 4.

The computing device 70 includes, in some embodiments, at least one processing device 80, such as a central processing unit (CPU). A variety of processing devices are available from a variety of manufacturers, for example, Intel® or AMD®. In this example, the computing device 70 also includes a system memory 82, and a system bus 84 that couples various system components including the system memory 82 to the processing device 80. The system bus 84 is one of any number of types of bus structures including a memory bus, or memory controller; a peripheral bus; and a local bus using any of a variety of bus architectures.

Examples of computing devices suitable for the computing device 70 include a server computer, a desktop computer, a laptop computer, a tablet computer, a mobile computing device (such as a smartphone, an iPod® or iPad® mobile digital device, or other mobile devices), or other devices configured to process digital instructions.

The system memory 82 includes read only memory 86 and random access memory 88. A basic input/output system 90 containing the basic routines that act to transfer information within computing device 70, such as during start up, is typically stored in the read only memory 86.

The computing device 70 also includes a secondary storage device 92 in some embodiments, such as a hard disk drive, for storing digital data. The secondary storage device 92 is connected to the system bus 84 by a secondary storage interface 94. The secondary storage devices 92 and their associated computer readable media provide nonvolatile storage of computer readable instructions (including application programs and program modules), data structures, and other data for the computing device 70.

Although the exemplary environment described herein employs a hard disk drive as a secondary storage device, other types of computer readable storage media are used in other embodiments. Examples of these other types of computer readable storage media include flash memory cards, digital video disks, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 92 or memory 82, including an operating system 96, one or more application programs 98, other program modules 100 (such as the software engines described herein), and program data 102. The computing device 70 can utilize any suitable operating system, such as Microsoft Windows™, Google Chrome™, Apple OS, and any other operating system suitable for a computing device.

In some embodiments, a user provides inputs to the computing device 70 through one or more input devices 104. Examples of input devices 104 include a keyboard 106, mouse 108, microphone 110, and touch sensor 112 (such as a touchpad or touch sensitive display). Other embodiments include other input devices 104, such as a camera, or another biomarker detector. The input devices are often connected to the processing device 80 through an input/output interface 114 that is coupled to the system bus 84. These input devices 104 can be connected by any number of input/output interfaces, such as a parallel port, serial port, game port, or a universal serial bus. Wireless communication between input devices and the interface 114 is possible as well, and includes infrared, BLUETOOTH® wireless technology, 802.11, cellular, or other radio frequency communication systems in some possible embodiments.

In this example embodiment, a display device 116, such as a monitor, liquid crystal display device, LED display device, projector, or touch sensitive display device, is also connected to the system bus 84 via an interface, such as a video adapter 118. In addition to the display device 116, the computing device 70 can include various other peripheral devices (not shown), such as speakers or a printer.

When used in a local area networking environment or a wide area networking environment (such as the Internet), the computing device 70 is typically connected to the network through a network interface 120, such as an Ethernet interface or a wireless (WIFI or cellular) interface. Other possible embodiments use other communication devices. For example, some embodiments of the computing device 70 include a modem for communicating across the network.

The computing device 70 typically includes at least some form of computer readable media. Computer readable media includes any available media that can be accessed by the computing device 70. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 70. Computer readable storage media does not include computer readable communication media. One example of a computer readable storage medium is a computer readable storage device, which is a physical device that stores digital data. A specific example of computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

Some embodiments according to the present disclosure provide one or more of the following features: to secure that the origin and safety data of the meat is not tempered with in transfer; to secure safe transmission of any other data from the tank/fish to the end user; and to secure safe and secure info about the production plant, its owners and bank details for each batch.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A farmed fish tracking and verification system for a batch of fish, the system comprising:
   a biomarker database storing biomarker information, the biomarker information identifying a biomarker present in each fish of the batch of fish, wherein the biomarker is introduced into the fish by including the biomarker in food fed to the fish, wherein the biomarker is detectable in flesh of the fish, wherein the biomarker is detectable in the flesh of the fish;
a production database storing production information, the production information providing information about the production of the fish;
a computing device, including a biomarker detector and a display, configured to display fish production information; and
a server configured to:
receive a request containing biomarker information;
access the biomarker database and the production database for information related to the requested biomarker information; and
display the information related to the requested biomarker information on the computing device, the displayed information including information related to the raising of the batch of fish corresponding to the requested biomarker information.

2. The farmed fish tracking and verification system of claim 1, wherein the fed biomarker becomes detectable in a fish product from the processing of the fish.

3. The farmed fish tracking and verification system of claim 1, wherein the information stored in the biomarker database and in the production database is stored in a blockchain.

4. The farmed fish tracking and verification system according to claim 1, wherein the computing device includes a camera and computer readable storage media that stores data instructions that, when executed by the computing device, causes the computing device to:
capture an image of a fish product produced from the batch of fish, using the camera;
process the image to generate a biomarker identifier; and
send the request including the biomarker identifier to the server.

5. The farmed fish tracking and verification system of claim 1, wherein the server is further configured to:
accept or reject the batch of fish corresponding to the requested biomarker information, based on the displayed information.

6. The farmed fish tracking and verification system according to claim 1, wherein one or more of the fish in the batch of fish are processed into at least one fish product, wherein the biomarker is detectable in the fish product.

7. A method of tracking and verifying information associated with a batch of fish, the method comprising:
introducing a unique biomarker into a batch of fish by including the biomarker in food fed to the fish, and wherein the biomarker is detectable in the flesh of the fish;
storing information related to the unique biomarker in a biomarker database;
storing information related to production of the batch of fish in a production database;
receiving a request containing biomarker information;
accessing the biomarker database and the production database for information related to the requested biomarker information; and
displaying the information related to the requested biomarker information, the displayed information including information related to the raising of the batch of fish corresponding to the requested biomarker information.

8. The method of claim 7, wherein the biomarker is detectable in a fish product from the processing of the fish.

9. The method of claim 7, further comprising:
storing funding information in a funding database regarding funders who have contributed funds for the production of the fish, wherein the stored funding information can include one or more of:
information regarding the amount of funding to cover expenses for the raising of the fish, equipment rental, capital expenditures, management expenses, and profit margin;
information regarding one or more sources of funding used to raise the batch of fish, including the accounts of the funders; and
payment instructions for the funders; and
upon sale of the fish product, automatically transferring proceeds from purchasers' accounts to the funders' accounts, based on the payment instructions.

10. The method of claim 7, further comprising:
scanning a fish for biomarker information;
accessing the biomarker database and the production database for information related to the scanned biomarker of the scanned fish;
displaying the information related to the scanned biomarker of the scanned fish; and accepting or rejecting the scanned fish, based on the displayed information.

11. The method of claim 7, wherein one or more of the fish in the batch of fish are processed into at least one fish product, wherein the biomarker is detectable in the fish product.

12. The method of claim 7, wherein the information related to the production of the batch of fish includes one or more of biology in the tank in which the batch of fish are raised, water conditions in the tank, status of fish development, food fed to the fish, details of the biomarker in the fish food, and weather conditions.

13. At least one non-transitory computer-readable storage device storing data instructions that, when executed by at least one processing device of a system, cause the system to:
store information related to the unique biomarker in a biomarker database, wherein the unique biomarker corresponds to a biomarker has been introduced into a batch of fish, wherein the biomarker is introduced into the fish by including the biomarker in food fed to the fish, and wherein the fed biomarker is detectable in the flesh of the fish;
store information related to production of the batch of fish in a production database;
receive a request containing biomarker information;
access the biomarker database and the production database for information related to the requested biomarker information; and
display the information related to the requested biomarker information, the displayed information including information related to the raising of the batch of fish corresponding to the requested biomarker information.

14. The at least one computer-readable storage device of claim 13, wherein one or more of the fish in the batch of fish are processed into at least one fish product, wherein the biomarker is detectable in the fish product.

15. The at least one computer-readable storage device of claim 14, wherein the information related to the production of the batch of fish includes one or more of biology in the tank in which the batch of fish are raised, water conditions in the tank, status of fish development, food fed to the fish, details of the biomarker in the fish food, and weather conditions.

16. The at least one computer-readable storage device of claim 14, wherein the instructions further cause the system to:

scan the fish product of a fish for biomarker information;

access the biomarker database and the production database for information related to the scanned biomarker of the scanned fish product;

display the information related to the scanned biomarker of the scanned fish product; and accept or reject the scanned fish product, based on the displayed information.

17. The at least one computer-readable storage device of claim 13, wherein the biomarker is detectable in a fish product from the processing of the fish.

18. A fish farming and distribution system comprising a farmed fish tracking and verification system operable to introduce at least one biomarker into a batch of fish, the farmed fish tracking and verification system comprising:

at least one database identifying the biomarker and storing information about the biomarker and raising the batch of fish, wherein the biomarker is introduced into the fish by including the biomarker in food fed to the fish, and wherein the fed biomarker is detectable in the flesh of the fish; and a computing device, including a biomarker detector and a camera, configured to display fish production information; and a server configured to:
  receive a request containing biomarker information;
  access the database for information related to the requested biomarker information; and
  display the information related to the requested biomarker information on the computing device, the displayed information including information related to the raising of the batch of fish corresponding to the requested biomarker information.

19. The fish farming and distribution system of claim 18, wherein the server is further configured to:

store funding information in a funding database regarding funders who have contributed funds for the production of the fish, wherein the stored funding information can include one or more of:
  information regarding the amount of funding to cover expenses for the raising of the fish, equipment rental, capital expenditures, management expenses, and profit margin;
  information regarding one or more sources of funding used to raise the batch of fish, including the accounts of the funders; and
  payment instructions for the funders; and
upon sale of the fish product, automatically transfer proceeds from purchasers' accounts to the funders' accounts, based on the payment instructions.

20. The fish farming and distribution system of claim 18, wherein the biomarker information includes a new, unique biomarker introduced into a new batch of fish, wherein the new, unique biomarker is stored in the database.

* * * * *